Figure 1:
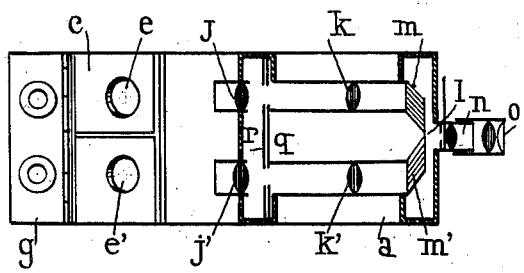

March 15, 1932.   G. BERNHEIM   1,849,607

APPARATUS FOR THE COMPARISON AND MEASUREMENT OF LUMINOSITY

Filed April 9, 1930   2 Sheets-Sheet 1

INVENTOR
Georges BERNHEIM
by
Attorney

March 15, 1932. G. BERNHEIM 1,849,607
APPARATUS FOR THE COMPARISON AND MEASUREMENT OF LUMINOSITY
Filed April 9, 1930 2 Sheets-Sheet 2
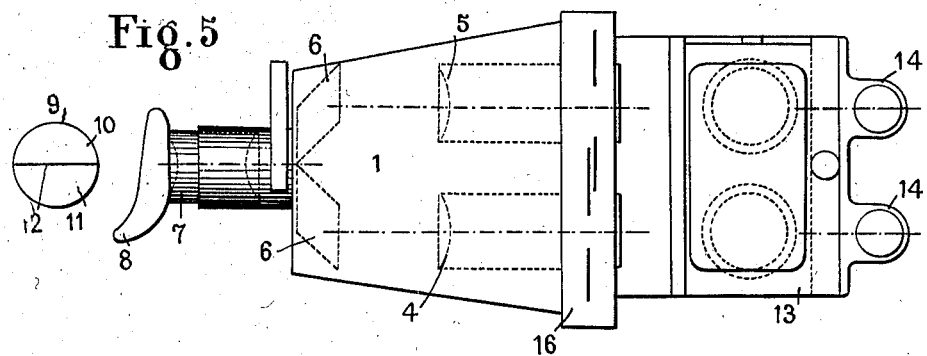
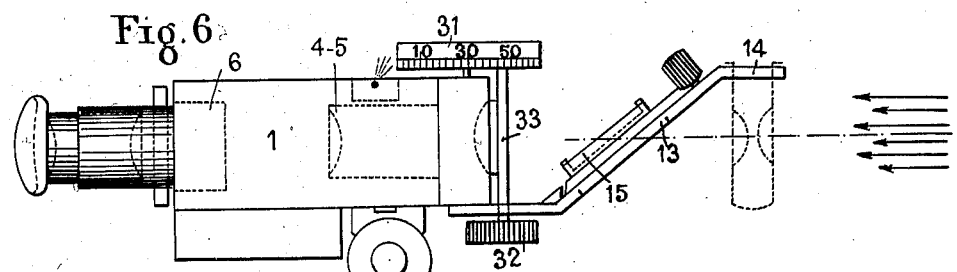
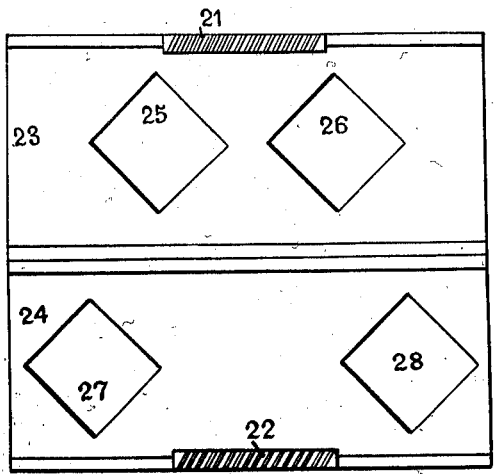
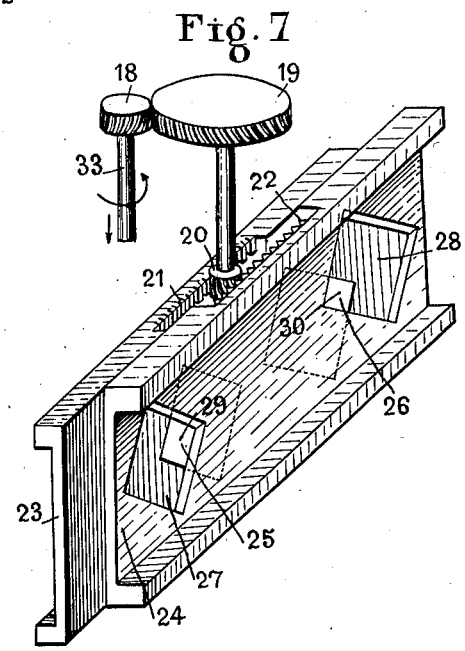
INVENTOR
Georges BERNHEIM
by
Attorney Patented Mar. 15, 1932

1,849,607

UNITED STATES PATENT OFFICE

GEORGES BERNHEIM, OF PARIS, FRANCE

APPARATUS FOR THE COMPARISON AND MEASUREMENT OF LUMINOSITY

Application filed April 9, 1930, Serial No. 442,845, and in France April 11, 1929.

The present invention relates to a photometer, that is, to an apparatus for the comparison of the lighting of two surfaces whether solid, liquid or gaseous, by reflection, luminescence, or transparency. In a well known type of apparatus, used as a spectrophotometer, the two selected surfaces of the spectrum are observed through rectangular slots whose width can be changed until their luminous regions, transmitted through the optical system of the spectroscope comprising a total reflection prism, give equal impressions to the eye. The size of the surfaces is changed by means of a differential screw adapted to displace screen plates, thus increasing the width of one slot while at the same time reducing the width of the other slot to a like degree. However, such slots which are suitable for comparative observations with the spectroscope, are by no means adapted for the observation of the illumination of the two surfaces, and these cannot be compared, as the ends of the slots are too far from the mean visual ray which the eye observes alone, with a very limited field around this ray.

It has also been proposed to use lighted surfaces of square form, whose size can be changed by the movement of plates forming screens, according to a diagonal of the square, and the eye may then observe the whole of the surface of the square surrounding the central visual ray. However, such apparatus comprises two screws provided with graduated drums, each acting separately upon the screen-plates of the two surfaces under comparison. It is thus a slow, difficult, and often impossible operation to change size of the two surfaces until the amounts of light which they furnish to the eye will coincide. If in order to simplify the method, it is desired to leave one opening invariable, this must necessarily be opened to the maximum degree, so as to avoid reducing the luminosity of the region under observation; but herein the observer can only reduce the other region by means of an adjusting screw, and he must thus place the substance having the least luminosity on the same side as the fixed opening. However, it is very difficult, and even impossible, with certain rays, to estimate the luminous intensity, and especially as two objects to be compared should in general be observed in monochromatic light.

The photometric comparing apparatus according to the invention herein obviates all the defects observed in the known apparatus, and it affords results which cannot be obtained in any of the said apparatus. It is characterized by the use of shutters with square openings, movable by rack and pinion at the same time and in opposite directions, whereby one of the surfaces will be increased while the other decreases, and thus the quantities of light received by the eye will necessarily be made to coincide by a single operation, and the eye also receives, without displacement, the impressions due to the whole of each surface surrounding the central visual ray.

Figure 2:
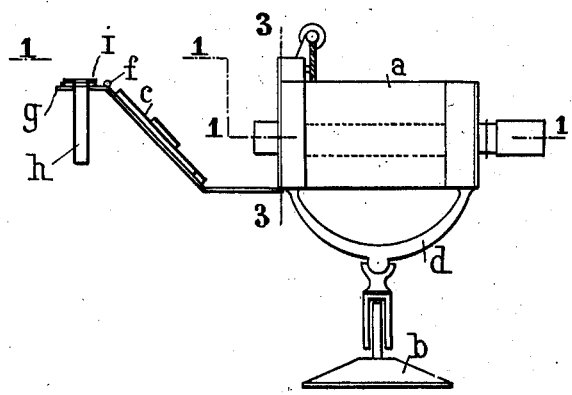
Figure 3:
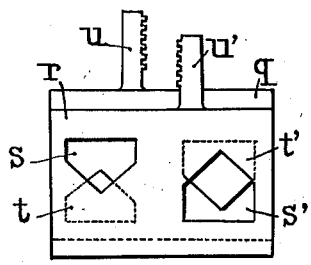
Figure 4:
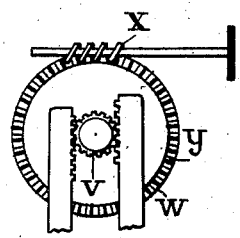

In the accompanying drawings which show by way of example a constructional form of photometer:

Fig. 1 is a plan view of the apparatus with a cross section along the line I—I of Fig. 2, Fig. 2 is a side view, Fig. 3 shows an embodiment of the screen plates on a larger scale, Fig. 4 is a view similar to Fig. 3 of the actuating device of such plates, Fig. 5 is a plan or diagrammatic top view of the apparatus as arranged in Fig. 2, Fig. 6 is an elevational view, Fig. 7 is a view of the differential mechanism showing a set of shutters with square openings, and the means for controlling the same, Fig. 8 is a front view of the shutters represented in Fig. 3 with their racks.

In the embodiment shown in Figs. 1 to 4 the apparatus comprises a box $a$ mounted on a vertically sliding support $b$ provided with an arm $d$ which may perform a universal movement or a movement in a vertical plane allowing any examination to be made in any position. A frame $c$ (Fig. 2) is secured on the box $a$ of the apparatus. Said frame is arranged for accommodating plates which carry the substances $e'$ to be examined. The upper part of said frame is connected by means of a hinge $f$ with a support $g$ of tubes $h$ provided for the observation of liquids. An annular screen $i$ is arranged on such support for hiding the edges of said tubes in order to prevent any reflection of light of certain characteristic rays.

The substances or objects to be observed $e$—$e'$ are placed at the focus of two lenses $j$—$j'$ and in front of said lenses are arranged two lenses $k$—$k'$ which are similar to the first ones but inverted and whose faci converge at $l$. Prisms $m$—$m'$ are arranged in front of said lenses and the magnifying eye piece $n$ is provided in front for the operator's eye. The eye piece is provided with a protecting hood $o$.

Arranged at a convenient distance from the first lenses $j$—$j'$ is the screen with variable openings. It consists of two plates $q$—$r$ which may be moved in opposite directions, each of which is provided with two orifices $s$—$s'$—$t$—$t'$ directed in opposite directions as shown in Fig. 3.

The corresponding orifices always allow two openings of square shape to appear in said screen, the displacement of such plates taking place along the diagonal of each square. The plates receive simultaneous movement by means of racks $u$—$u'$ in mesh with a common pinion $v$ mounted on the spindle of a drum $w$ (Fig. 4) having scale divisions. Said drum is actuated by means of a screw $x$ meshing with a helicoidal rack $y$ arranged on the drum $w$.

The light which is either emitted or reflected by the bodies or substances $e$—$e'$ carried on the frame $c$ is transmitted as parallel rays by the lenses $j$—$j'$ to the lenses $k$—$k'$. The luminous groups of rays which are rendered convergent by the latter pass through prisms $m$—$m'$ which bring the images of the two bodies side by side in the plan of the focus $l$ where the two luminous regions are thus visually registered may be examined through the eye piece $n$. The carrier $c$ being rigid with the apparatus, the examined substances or bodies follow the movement of said apparatus and the best position is obtained by a single movement for the observation either by incidences or by transparency.

The angle formed by the carrier $c$ on the box of the apparatus is permanently fixed so that the radiations emitted by some sources cannot be reflected by the objects under examination into the field of the lenses, that is to say that the operator will not measure the light emitted by said objects themselves. In the case of absorption measurement, if it is desired to bring the light reflected by the object into the field of the lenses, it is sufficient to displace the luminous source or to allow the whole apparatus to swivel upon its pivot.

Due to the position of said carrier $c$, the images will visually register at $l$ on the whole width of the eye which will not have to move in any way for appreciating the difference of lighting of both objects. For that purpose, according to well known laws of photometry it is only necessary to reduce the luminous surface on one of the lenses $j$—$j'$ or to increase that of the other. In the present apparatus, the reduction of one lens and the increase of the other are automatically effected at the same time. It is sufficient for that purpose to rotate the drum $w$ in either direction by means of the screw $x$; the pinion $v$ by means of racks $u$—$u'$ displaces plates $q$ and $r$ and, consequently the three openings in front of lens $j$, for instance, increases whilst that in front of the lens $j'$ is reduced or inversely. It will thus, by increasing one group of parallel rays and reduction of the other bundle, be possible to obtain the equality of both regions in the plan $l$ examined by the eye. The drum $w$ may have a graduation with a zero corresponding to the equality of both openings and the graduation may extend to 180° in each direction. It is thus possible to quickly determine the equality of light of both regions. The graduation of the drum gives a measured reading of the proportions of lighting of the two objects. The eye piece $o$ allows the operator to bring his eye to a convenient distance from the images formed at $l$.

It is possible to arrange between the two lenses of the eye piece some filters such as $p$ (various glaces, gelatinous liquids, etc.) providing a whole series of various radiations so as to render possible the exact comparison of the colour of both regions.

In the embodiment of Figs. 5 to 8, the apparatus has the form of a trapezoidal box 1 (Fig. 5) mounted on a support 2, and provided with a device for vertical adjustment by sliding, including a setting nut 3. The apparatus is hinged so as to allow it to assume the most favorable position for examination and the most convenient one for the observer.

The said box contains the optical system, which comprises a pair of objective lenses 4—5, a separating prism 6, and an eye-piece 7, provided with a protecting hood 8.

The said arrangement shows in the field of the apparatus a luminous circle 9 divided into two equal parts 10—11 by a very fine vertical line 12, and in this manner the comparison between the two regions can be made in a more ready manner.

The objects to be examined are disposed at the exterior of the said box in front of the objective lenses 4—5 upon an object-carrier 13 provided with a universal joint, which constitutes one of the marked advantages of the present photometric apparatus. The said object-carrier, which is secured to the apparatus, is adapted to hold the several containers in which the substances under examination are placed. When employing liquids in test tubes, there are used supports 14 which are disposed at the extreme rear part. In the case of solid or viscous substances, use is made of small vessels 15 disposed on the inclined part of the object carrier (Fig. 6).

The rays of light from the substances are received on the said objective lenses 4—5, and the operator observes in his eye-piece 7 two half-circles in adjacent position, each corresponding to one of the substances.

If there is a difference in the luminous value or the coloration, the operator will perceive this at once, and will then adjust the apparatus so as to equalize the two regions and to give them an exactly identical appearance. This can be readily performed by means of the differential device 16 situated in the box, as shown in Figs. 3 and 4. He uses the milled knob 17 (Fig. 6) in order to slide one before the other, by a set of racks and pinions 18—19—20 and 21—22, two shutters 23—24 pierced with respective square apertures 25—26 and 27—28. The parts are moved in the direction of the diagonal of the squares. Said square apertures are so disposed that they will form square diaphragms with variable openings, through which the rays from the objects will proceed in greater or less quantity. The centres of said diaphragms 29—30 remain in all cases upon the optical axis of the objective lenses 4—5, and when one diaphragm increases in aperture size, the other will close by the same amount, and thus the full opening of one diaphragm will correspond to practically the complete closing of the other. Hence the opening in front of one objective lens such as 5 will increase while the opening in front of the lens 4 diminishes, or inversely. It is readily observed that it will be possible in all cases to thus obtain an equal intensity of the two regions.

The amount of displacement of the shutters can be observed by the means of the drum 31 having scale divisions, which is secured to the pinion 32 mounted on the shaft 33 of the pinion 18. The drum is movable before a stationary pointer, and each position of the shutters corresponds to a scale division of the drum, thus giving a measurement of the ratio between the luminous intensities of the two substances.

In front of the eye-piece in a disk provided with seven light screens which are quite monochromatic and will give bands of a well-defined wavelength, thus affording exact comparisons between the two regions in the different parts of the spectrum.

Since the said object carrier 13 forms part of the present photometric apparatus, the objects under examination will follow the displacement of the apparatus through all horizontal swivelled positions and all inclinations, and the best position can be obtained by a single movement for observation by reflection or by transparency. The angle formed by the object-carrier and the box of the comparing apparatus is permanently fixed in such manner that the rays from certain undesired light sources cannot be reflected by the object under examination and thus enter the objective lenses, and hence the operator will measure only the light coming from the objects themselves. For measurements in cases of absorption, in order to bring the light reflected by the objects into the field of the lenses, it is simply necessary to displace the illuminant or to turn the whole apparatus about.

What I claim is:

1. An apparatus for accurate comparison and measurement of the intensity of illumination of solid, liquid and gaseous bodies, including the combination, with an eye piece, of a pair of conjugated diaphragms interposed between said eye piece and the object to be examined, said eye piece being common to both of said pair of diaphragms, and in which pair each diaphragm is arranged to be automatically increased in aperture while the other is correspondingly decreased and vice versa, whereby the intensities of the light received from said diaphragms by said eye piece are made equal.

2. An apparatus for accurate comparison and measurement of the intensity of illumination of solid, liquid and gaseous bodies, including the combination, with an eye piece, of a support of substantially rigid construction throughout and supporting said eye piece, a portion of said support arranged to receive the object to be examined, a pair of conjugated diaphragms upon said support interposed between said eye piece and the object to be examined, said eye piece being common to both of said pair of diaphragms, and in which pair each diaphragm is arranged to be automatically increased in aperture while the other is correspondingly decreased and vice versa, whereby the intensities of the light received from said diaphragms by said eye piece are made equal and means including a base providing for changing the position of said support whereby to utilize various sources of light for examination of said object by means of said apparatus.

3. An apparatus for accurate comparison and measurement of the intensity of illumination of solid, liquid and gaseous bodies, including the combination, with an eye piece, of a base member for said apparatus, a support carried upon said base member and arranged to be raised or lowered and swivelled or inclined thereon, a housing for said support carrying said eye piece for the optical system of said apparatus rigidly mounted upon said support, means rigidly associated with said support to receive the object to be examined, and a pair of conjugated diaphragms upon said support interposed between the eye piece and the object to be examined, said eye piece being common to both of said pair of diaphragms, and in which pair each diaphragm is arranged to be automatically increased in aperture while the other is correspondingly decreased and vice versa, whereby the intensities of the light received from said diaphragms by said eye piece are made equal.

In testimony whereof I have hereunto set my hand at Paris this 25th day of March 1930.

GEORGES BERNHEIM